UNITED STATES PATENT OFFICE.

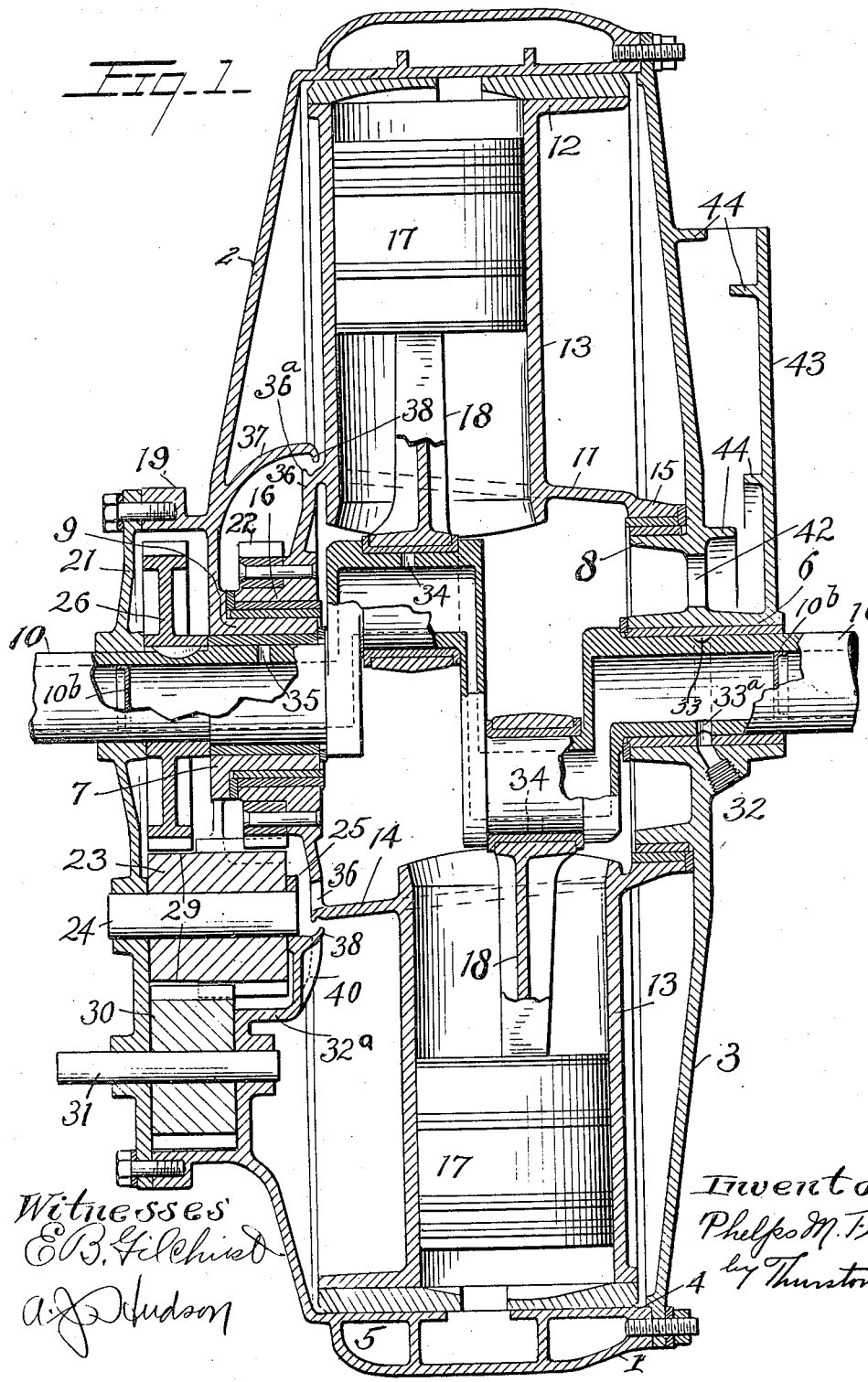

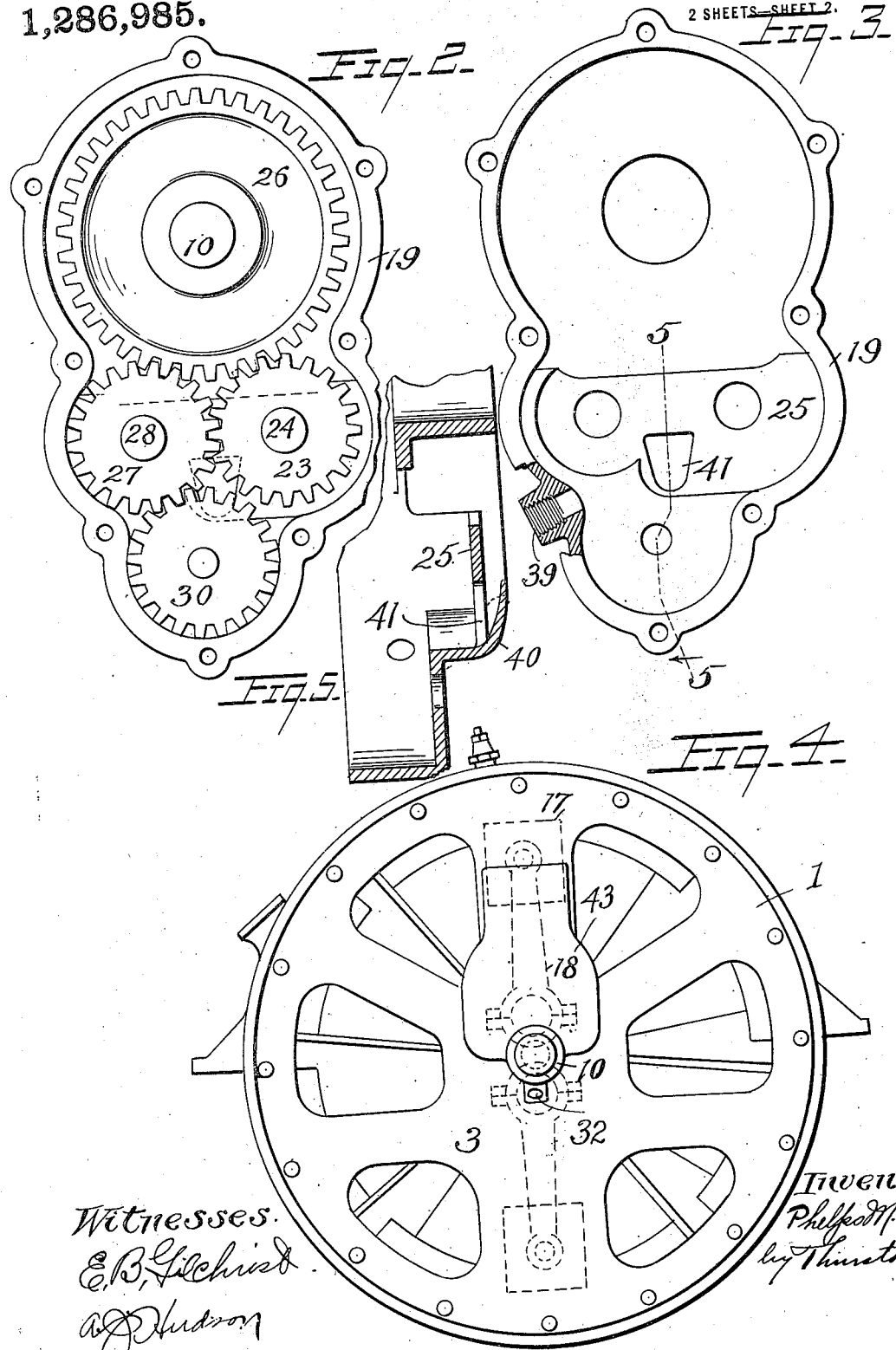

PHELPS M. FREER, OF DETROIT, MICHIGAN.

LUBRICATING SYSTEM FOR ROTARY ENGINES.

1,286,985.

Specification of Letters Patent. Patented Dec. 10, 1918.

Application filed December 14, 1912, Serial No. 736,686. Renewed April 24, 1918. Serial No. 230,611.

*To all whom it may concern:*

Be it known that I, PHELPS M. FREER, a citizen of the United States, residing at Detroit, in the county of Wayne and State of Michigan, have invented a certain new and useful Improvement in Lubricating Systems for Rotary Engines, of which the following is a full, clear, and exact description.

This invention relates to a lubricating system for engines, with more particular reference to the type of rotary cylinder engines.

The engine for which the lubricating system is particularly designed forms the subject matter of my copending application, Serial No. 729,720, filed Nov. 6th, 1912.

However, I would not limit the system to this particular engine, except wherein the wording of the claims specifically so limits.

Generally speaking, the invention comprises the elements and combinations thereof set forth in the accompanying claims.

Reference should be had to the accompanying drawings forming a part of this specification, in which Figure 1 is a vertical central section through an engine in connection with which the lubricating system is shown. Fig. 2 is a front elevation of a portion of the showing in Fig. 1, with the cap of the gear case removed. Fig. 3 is an elevation of a portion of the engine shown in Fig. 1 with the cap of the gear case, gears and shaft removed. Fig. 4 is an end elevation of the engine shown in Fig. 1, upon the opposite side of that shown in the previous figures; Fig. 5 is a section on the line 5—5 of Fig. 3.

I will in a general way explain so much of the construction of the engine shown as will be necessary to understand the manner in which the lubricating system functions.

The engine comprises a fixed casing or stator generally represented at 1, this casing being of metal preferably cast iron, the axis of the casing being preferably horizontally disposed.

The interior of the casing is provided with an annular surface, which is continuous except for certain openings providing the inlet and exhaust ports respectively for the engine.

Preferably, the stator is made separable, that is to say,—it is provided with a side 2 which is fixed to the stator, and a side 3 which is removable. The casing or stator is provided with a water jacket which may be represented at 5.

Shaft bearings are provided in the side walls of the stator, one of these bearings being represented at 6, and the other being represented at 7. Concentric with both of these bearings are flanges 8 and 9, which are of larger diameter, these being for the purpose of forming bearings for the rotor.

The bearings 6 and 7 support a crank shaft which is represented at 10, this crank shaft being supported in the bearings mentioned in the usual manner.

Within the casing there is a rotatable member or rotor which may be generally designated at 11 which is provided with an annular rim 12 which is surfaced to fit the annular surface 4, of the stator, which has heretofore been described, the fit between these parts being such as to permit rotation without binding, and at the same time prevent leakage of gas from the cylinders.

There are any desired number of cylinders 13, which cylinders are exactly alike. These cylinders are preferably formed integral with the stator. At their outer ends, they are provided with openings through the rim of the stator, and at their inner ends are open and communicate with a central chamber formed by an annular hub or flange 14.

As will be seen from the drawing, the inner end of each cylinder extends within the crank case and in effect forms a flange around the cylinder opening. This prevents the lubricant which may flow upon the walls of the crank case from entering the cylinders.

This hub or crank case is provided with annular bearing flanges 15 and 16, which coöperate with the flanges 8 and 7, respectively, formed upon the stator, as heretofore described.

It will thus be clear that the rotor is supported independently of the crank shaft, so that this relieves the crank shaft bearings of any extra duty or strain, and by so much reduces the friction between the crank shaft and bearings and increases the wear and life of the bearings.

Within the cylinders 13 there are pistons 17 which are operatively connected to piston rods 18 which are in turn connected with the crank shaft 10 in the usual manner.

In the type of engine herein shown, the rotor and the crank shaft turn in opposite directions, the purpose of which will be clearly understood by reference to my application hereinbefore mentioned.

For the purpose of accomplishing the opposite rotation of the parts mentioned, I provide gearing operatively connecting the crank shaft and the rotor.

These gears are housed within a gear casing which is formed in part upon the exterior of the side 2 of the stator. For this purpose, the stator is formed with an extending flange 19, the configuration of which is more clearly seen in Fig. 3, to which is secured a cover 21.

To the rotor there is rigidly secured a gear 22. This gear meshes upon the lower side thereof with a gear 23, which gear is mounted upon a stub shaft 24, the outer end of the shaft 24 being mounted in the cover 21 of the gear casing, while the inner end is mounted in an upwardly extending flange 25 which is carried by the side 2 of the stator. The gear 23 is free to turn upon its shaft 24. Carried by the crank shaft 10 is a gear 26 which is rigidly secured to it, and this gear meshes with a gear 27 which is mounted upon the shaft 28, the last mentioned shaft being in the same generally horizontal plane as the shaft 24. These gears 23 and 27 are formed with teeth which extend only partially across their surface. The teeth of the gear 23, as will be seen in Fig. 1, extend a little more than half way across the surface and terminate, thereby leaving a hub portion which may be indicated at 29, which provides a path permitting rotation of the gear 26, without meshing with the gear 23.

The gear 27 is formed in a similar manner, except that whereas as shown in Fig. 1, the left hand portion of the gear 23 is formed with a shoulder having no teeth, the gear 28 is similarly formed upon the right hand portion, so that the gear 23 will not mesh with it. It will thus be seen that the gears 22 and 26 mesh with smaller gears 27 and 23 respectively without interference. However, the teeth upon the gears 23 and 27 are sufficiently long so that they engage with each other. Therefore, rotation of the gear 22 will be transmitted through the gear 23, to the gear 27, and thence to the gear 26.

There is also a toothed member 30 which is mounted upon a stub shaft 31, this toothed member meshing with the gear 27, so that it is rotated. For the purpose of receiving this gear 30, the side 2 extends inwardly, as suggested at 32ª, so that the portion of the casing which receives the gear 30, is of just the size to accommodate the gear and no larger. This toothed member plays no part, as far as the running of the engine is concerned, except for the fact that it acts as a pump for forcing the lubricating oil, as will be later explained.

The lubricating feature of the invention which is the real matter of invention disclosed herein, will now briefly be described. At 32 there is provided a threaded opening, to which may be secured a pipe or conduit, whereby lubricating oil will be introduced either being forced, or the desired pressure secured by gravity from a suitable storage receptacle. This opening 32 coöperates with an annular groove 33 formed in the outer surface of the shaft and the groove finds outlet through an opening 33ª to the interior of the crank shaft 10 which is hollow, as will be clearly seen from the drawing. The ends of the crank shaft beyond those portions which are required for lubrication are closed by means of heads 10ª and 10ᵇ. The crank shaft and those portions which coöperate with the piston rods are provided with openings 34, through which oil may pass and lubricate the coöperating surfaces of the piston rod and crank shaft.

The bearing surface between the crank shaft and the bearing flange 9 is lubricated by means of the duct 35. It will be understood that these openings or ducts 33, 34 and 35 referred to are but indicative of any suitable way by which oil may be supplied from the hollow crankshaft to the piston rod bearings.

As the oil passes to the surfaces between the crank shaft and the piston rods, it will eventually work toward the end portions of these bearings, and drops of oil will be thrown into the cylinders. The oil thus thrown will be sufficient to cause the lubrication of the surfaces between the pistons and cylinders, and any excess oil accumulating will be thrown into the crank case, as the pistons reciprocate, and as the cylinders are rotated.

It will be noted that the walls forming the crank case are slanted so as to produce a conical interior configuration. Therefore the tendency of the oil as the rotor turns is to move toward the large end of the crank case. The wall of the rotor closing the larger end of the crank case is provided with a series of openings indicated at 36, through which the oil will be discharged largely by the centrifugal force acquired by the oil as the rotor is rotated.

The rotor is formed with a cupped ridge 36ª which surrounds the openings 36 and assists in throwing off any oil collecting thereon.

For the purpose of collecting the oil thus discharged, the wall 2 of the stator is near the upper portions provided with an inwardly curved flange 37 which is provided with a hooked portion 38. This flange 37 extends concentrically around the axis of the stator, but at the lower portion takes a slightly different configuration, due to the modification necessary to accommodate the gears which have heretofore been referred to. However, the continuation of the hook portion 38 will be noted as coöperating with the crank case of the rotor.

The oil discharged through the openings 36, as heretofore described, will lubricate the gear 22, which gear will carry the lubricant to the gears 23 and 27, which will in turn produce lubrication between the gear 27 and the gear 26, the lubricant eventually dropping down to the lower portion of the casing upon the exterior wall 2, and there coming into contact with the toothed member 30; and it will be elevated adjacent the opening 39, which is formed in the portion of the side 2 forming the gear casing or receptacle, and the lifting action of the toothed member 30 will act as a pump to force the lubricant which accumulates in the lower portion of the gear casing. As before explained the portion of the casing which receives the pump gear 30 is of sufficient size only to accommodate the said gear. Hence all the oil which reaches the gear is moved by it and there is no accumulation of lubricant in the gear casing. The lubricant thus forced from the exit 39 will be pumped in a suitable manner to the original source of supply.

The portion of the wall 2 of the casing of the stator which is represented at 25, in Fig. 1, and as before described, is provided with an outwardly extending lip forming a complementary portion to the flange 37. This flanged portion is provided with an outwardly extending or bulged portion indicated at 40 in Figs. 1 and 5. At this portion the wall 25 is provided with an opening which is indicated at 41 in Fig. 3, so that lubricant collecting in the flange portion carried by the wall 25 may find passageway to the interior of the gear casing, and thus be circulated. This construction prevents the overflow of lubricant from the flange carried by the wall 25 which would discharge upon the outside of the stator and be wasted.

The stator is provided with one or more openings indicated at 42, which openings communicate with the interior of the crank case. These openings permit air to flow in and out of the casing as the pistons reciprocate, it being understood that some provision of this sort is necessary in order that there be no compression, or, at least, no considerable compression within the crank case under normal conditions.

Upon the exterior of the stator there is formed an open ended casing indicated at 43, the lower portion of this casing covering the openings 42 so that the entrance or exit of the air through the openings 42 must be by way of the casing 43.

The walls of the casing 43 are provided with oppositely extending flanges or short walls upon the opposite sides thereof which baffle the air as it passes through the casing, and the air which is passing out will, by virtue of this baffling, deposit its oil which will flow to the bottom of the casing 43 and into the crank casing of the rotor.

Having thus described my invention, what I claim and desire to secure by Letters Patent is:

1. In an engine, the combination with a stator and a rotor member, the rotor member carrying thereon a cylinder in which is mounted a piston, a hollow crank shaft journaled in the stator, a piston rod connected with the piston and journaled upon the crank shaft, openings in the crank shaft which communicate with the bearings between the piston rod and crank shaft and crank shaft and stator bearings therefor, an opening in the stator communicating with the interior of the crank shaft whereby a lubricant may be supplied, means operatively connecting the crank shaft and the rotor, there being a casing carried by the stator in which the said means is inclosed, the said rotor being provided with a crank casing and provided with openings adjacent the gear casing, whereby oil collected within the crank casing is discharged into the casing as the rotor is rotated, and pumping means located in the lower part of the casing for discharging oil from the casing.

2. In an engine, the combination with a stator and a rotor member, the rotor member carrying thereon a cylinder in which is mounted a piston, a hollow crank shaft journaled in the stator, a piston rod connected with the piston and journaled upon the crank shaft, openings in the crank shaft which communicate with the bearings between the piston rod and crank shaft and crank shaft and stator bearings therefor, an opening in the stator communicating with the interior of the crank shaft whereby a lubricant may be supplied, gearing operatively connecting the crank shaft and the rotor, there being a casing carried by the stator in which the said gearing is inclosed, the said rotor being provided with a crank casing and provided with openings adjacent the gear casing, whereby oil collected within the crank casing is discharged into the gearing casing as the rotor is rotated, and pumping means located in the lower part of the gear casing for discharging oil from the gear casing.

3. In an engine, the combination with a stator of a rotor member carrying a cylinder which is provided with a piston, a hollow crank shaft journaled in bearings carried by the stator, a piston rod connected with the piston and journaled upon the crank shaft, there being openings from the interior of the crank shaft to the bearing surfaces between the crank shaft and the piston rod and the crank shaft bearings, said rotor being provided with a crank casing surrounding the crank shaft openings in one side of said casing, a casing carried by the stator, the openings in the crank casing being adjacent to said casing, and pumping means in the lower portion of said casing for discharging the lubricant therefrom.

4. In an engine, the combination with a stator member and a rotor member having a cylinder provided with a piston, a crank shaft journaled in bearings carried by the stator, a piston rod connected with the piston and being mounted upon the crank shaft, openings formed in the said crank shaft adjacent the several bearing surfaces thereon, gears operatively connecting the crank shaft with the rotor, a casing carried by the stator which incloses the said gears, said rotor being formed with a crank casing which incloses the crank shaft, openings formed in the end of said crank casing which is adjacent the gear casing, a ridged flange formed upon the said rotor and extending annularly around the openings in the rotor before mentioned, an annularly projecting flange carried by the stator, said flange extending adjacent the ridged flange carried by the stator, a gear in the lower portion of the gear casing which acts as a pump to raise the lubricant, and an opening in the said crank case adjacent the last mentioned gear through which the lubricant may be discharged, the said gear pump being operatively geared to certain of the gears carried within the gear casing.

5. In an engine, the combination with a stator, of a rotor member provided with a cylinder, a piston in said cylinder, a crank shaft journaled in stator bearings, a piston rod connected with the piston and journaled upon the crank shaft, said crank shaft being provided with openings adjacent the bearing surfaces thereon, means for supplying the lubricant to the interior of the crank shaft, a crank casing carried by the rotor and surrounding the crank shaft, openings in the end wall of said crank casing, said openings being adjacent the outer bounding wall of the crank casing, gears operatively connecting the rotor with the crank shaft, a casing carried by the stator in which the said gears are incased, the said openings in the crank casing discharging any lubricant collecting in the crank casing into the gear casing, an annular flange carried by the gear casing and extending toward and adjacent the crank casing carried by the rotor, a pocket formed in the lower part of said flange, said pocket having an opening which communicates with the interior of the gear casing, a gear in the lower part of the gear casing, said gear meshing with and being driven by the gearing within the said casing, an opening in the gear casing adjacent the upper portion of the said gear whereby the gear will lift and force oil through the said opening.

6. In an engine, the combination with a stator and a rotor member, the rotor member carrying thereon a cylinder in which is mounted a piston, a hollow crank shaft journaled in the stator, a piston rod connected with the piston and journaled upon the crank shaft, openings in the crank shaft which communicate with the bearings between the piston rod and crank shaft and crank shaft and stator bearings therefor, an opening in the stator communicating with the interior of the crank shaft whereby a lubricant may be supplied, means operatively connecting the crank shaft and the rotor, there being a casing carried by the stator in which the said means is inclosed, the said rotor being provided with a crank casing and provided with openings adjacent the gear casing, whereby oil collected within the crank casing is discharged into the casing as the rotor is rotated.

7. In an engine, the combination with a stator and a rotor member, the rotor member carrying thereon a cylinder in which is mounted a piston, a hollow crank shaft journaled in the stator, a piston rod connected with the piston and journaled upon the crank shaft, openings in the crank shaft which communicate with the bearings between the piston rod and crank shaft and crank shaft and stator bearings therefor, an opening in the stator communicating with the interior of the crank shaft whereby a lubricant may be supplied, gearing operatively connecting the crank shaft and the rotor, there being a casing carried by the stator in which the said gearing is inclosed, the said rotor being provided with a crank casing and provided with openings adjacent the gear casing, whereby oil collected within the crank casing is discharged into the gearing casing as the rotor is rotated.

In testimony whereof, I hereunto affix my signature in the presence of two witnesses.

PHELPS M. FREER.

Witnesses:
K. CARLYLE,
MAURICE D. JOY.